May 10, 1960 J. P. LANNEN 2,935,876
BALANCE TESTING MACHINE
Filed Sept. 1, 1955 5 Sheets-Sheet 1

INVENTOR
JOSEPH P. LANNEN

BY
ATTORNEY

May 10, 1960 — J. P. LANNEN — 2,935,876
BALANCE TESTING MACHINE
Filed Sept. 1, 1955 — 5 Sheets-Sheet 4

INVENTOR
JOSEPH P. LANNEN
BY
ATTORNEY

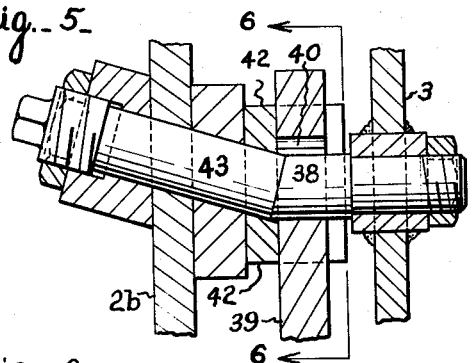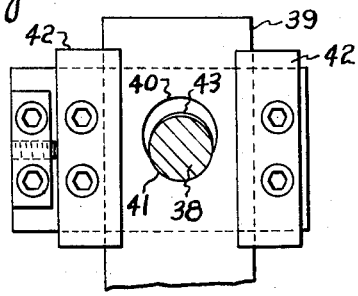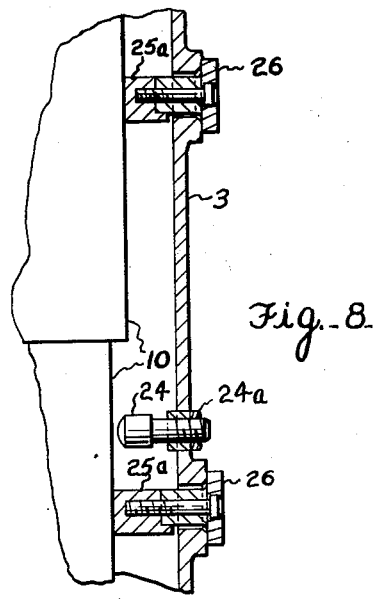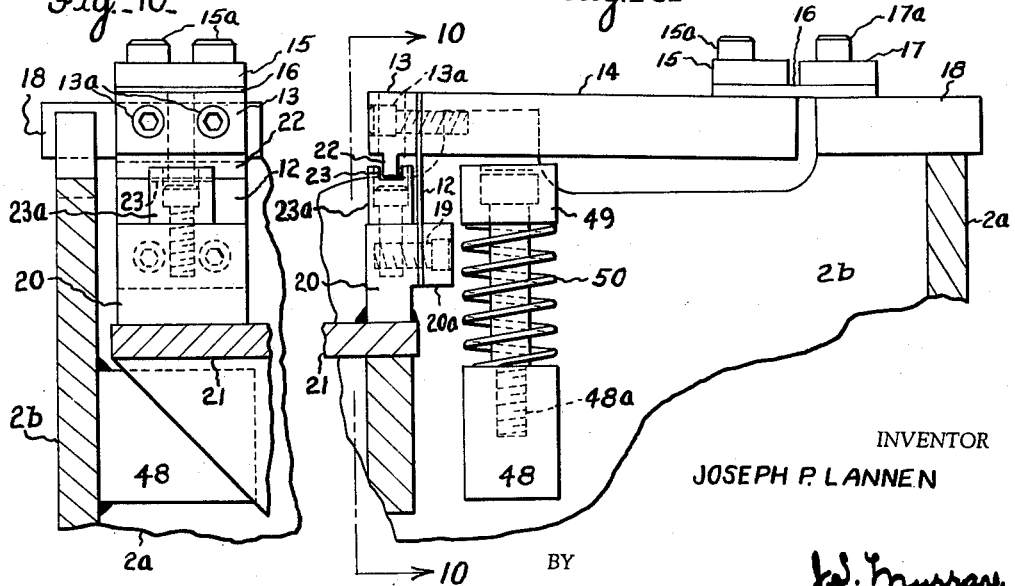

United States Patent Office 2,935,876
Patented May 10, 1960

2,935,876

BALANCE TESTING MACHINE

Joseph P. Lannen, Detroit, Mich., assignor to Micro-Poise Engineering and Sales Company, Detroit, Mich., a partnership Application September 1, 1955, Serial No. 531,962

16 Claims. (Cl. 73—482)

This invention relates to balance testing machines and particularly machines for universally balancing rotative work pieces to determine the moment and radial location of any weight lacking balance with respect to an axis of work rotation.

In such machines it has been a general practice to mount the work on a carrier pivoted for response to any unbalance of the work, the carrier pivot point or axis being disposed sufficiently above the center of gravity of the work to afford a stable equilibrium. Some types of rotative work, however, have their centers of gravity so elevated along their axes of rotation that considerable complexity and an undue upward extent of a balancing machine would be necessary to locate the carrier pivot at a higher level than said centers of gravity. An example of such a workpiece is a unit formed by a propeller and its drive shaft.

An object of the invention is to provide a balancing machine including a pivotal work carrier, suited to mount a workpiece with its center of gravity at a level above the pivotal axis of the carrier, and to overcome the resultant gravitational instability of the carrier and work by spring means resisting pivotal response of the carrier to any condition of unbalance.

Another object is to subject the carrier to two equally stressed and oppositely acting springs compensating for gravitational instability of the carrier and its load.

Another object is to adapt such compensating springs to be regulably stressed to overcome different amounts of gravitational instability resulting from different sizes, shapes and weights of workpieces.

Another object is to provide a hollow carrier of cylindrical form for receiving the drive shaft of a workpiece requiring to be balanced in unison with such shaft, and to adapt the carrier to be firmly clamped to the shaft with their axes coincident.

Another object is to employ means for flexibly suspending the carrier for tilting proportionately to any unbalance of a workpiece, and to provide an improved mechanism for relieving the suspension means of load when this is desirable.

Another object is to provide a hollow cylindrical carrier receiving a shaft of a workpiece to be tested, and to equip such carrier with a turntable seating the shaft and facilitating a rotary adjustment of the workpiece relative to the carrier.

These and various other objects are attained by the construction hereinafter described and illustrated in the accompanying drawings, wherein:

Fig. 5 is a vertical sectional detail taken on the line 5—5 of Fig. 4 and showing certain features of a mechanism for relieving the work carrier pivot means of load.

Fig. 6 is a relatively transverse sectional view of such mechanism, taken on the line 6—6 of Fig. 5.

Fig. 8 is a fragmentary vertical section taken on the line 8—8 of Fig. 1 and showing upper and lower work-clamping jaws installed on the carrier.

Fig. 9 is a vertical section taken on the line 9—9 of Fig. 1 and showing how one of the carrier-pivoting suspension plates is mounted.

Fig. 10 is a front view of said mounting, as indicated by the line 10—10 of Fig. 9.

Work carrier and its mounting

Figure 7:
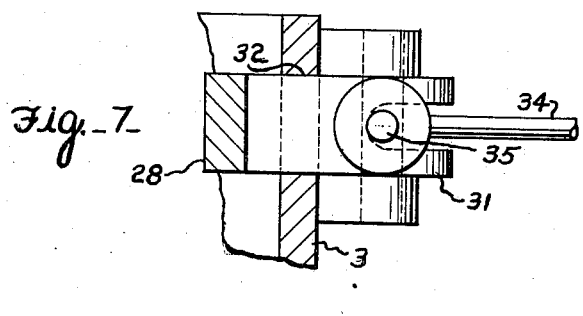
Fig. 7 is a vertical section taken on the line 7—7 of Fig. 1 and showing a portion of a work-clamping mechanism employed in the machine.

In these views, the reference character 1 designates a base plate rigidly surmounted by a housing 2 having a rear wall 2a and parallel side walls 2b and 2c, thus forming a horizontally disposed U, open at its front and top. Disposed upright and substantially centrally in the housing is a hollow cylindrical work carrier 3, suspended for forward and back swinging movement of small amplitude, as will be presently explained. Said carrier rigidly mounts a bottom plate 4 surmounted by a turntable comprising upper and lower plates 5 and 5a and a shock-absorbing medial plate 5b. The latter may be of rubber or the like. Suitable antifriction means 6 is interposed between the turntable and carrier bottom, establishing a vertical axis of rotation coinciding with the carrier axis. A hub 7 rigidly carried by the plate 5a extends centrally and freely downward through the carrier bottom to receive screws 8 rigidly attaching to the turntable a circular indexing plate 9 underlying the carrier and having marginal degree indications. A pointer 9a fixed on the carrier just above said graduations establishes an index point from which may be measured any desired angle of rotation of the turntable. In use of the machine there is seated on the turntable the shaft 10 of a propeller 11 or of any other workpiece subject in use to rotation and requiring balance-testing as a unit with its shaft.

Pivotal suspension of work carrier

To pivotally suspend the carrier 3, there is employed a pair of diametrically opposed flexible normally vertical coplanar plates 12 (Figs. 9 and 10), so mounted on the housing 2 as to afford them a slight up and down travel. Thus said plates have their upper margins clamped by blocks 13 and screws 13a to the forward ends of a pair of duplicate arms 14, extending within the housing respectively in proximity to the respective walls 2b and 2c. The rear ends of said arms are clamped by blocks 15 and screws 15a to the forward ends of a pair of horizontal plates 16 having their rear ends rigidly mounted by blocks 17 and screws 17a on shelves 18 surmounting the housing 2 and welded thereto. The plates 16 are springs having a slight up-and-down flexibility and thus permitting the arms 14 to tilt slightly upward from their normal horizontal positions, the front and rear clamping blocks 15 and 17 being sufficiently spaced apart (Fig. 9) to afford the slight required flexure of said plates.

The lower margin of each plate 12 is clamped by screws 19 between blocks 20 and 20a, one of which seats on and is rigidly attached, as by welding, to an arcuate flange 21 integrally outwardly projecting from the carrier. The pivot-forming plates 12 have sufficient free extent between their clamped upper and lower margins to afford a requisite slight forward and back flexure of such plates. A tongue 22 intergrally downwardly projecting from each block 13 is received, with slight clearance by a groove 23 in a block 23a rigidly surmounting the corresponding block 20, preventing any excessive flexure of the corresponding plate 12 in case the workpiece is inadvertently subjected to any severe shock or jar.

From the foregoing description, it is apparent that the plates 12 jointly establish a horizontal axis about which the carrier, with any applied load, may swing for determination of any unbalance. Such axis establishes a vertical plane wherein will lie the vertical axis of the carrier and of any work piece thereon, in absence of unbalance. Such vertical axis may be termed the axis of equilibrium of the carrier.

*Means for clamping work to and centering it in carrier*

Figure 2:
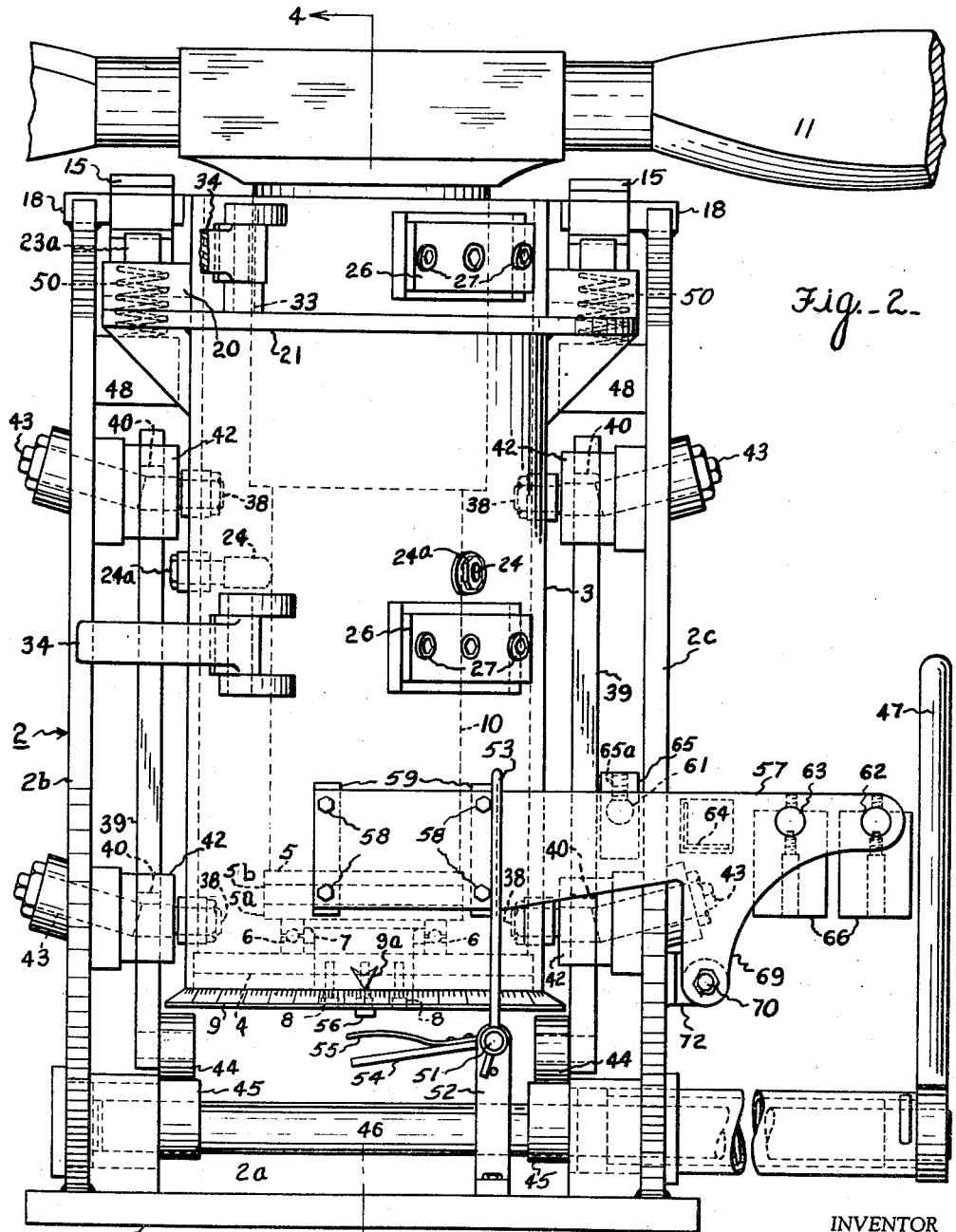
Fig. 2 shows the machine in front elevation.
Figure 3:
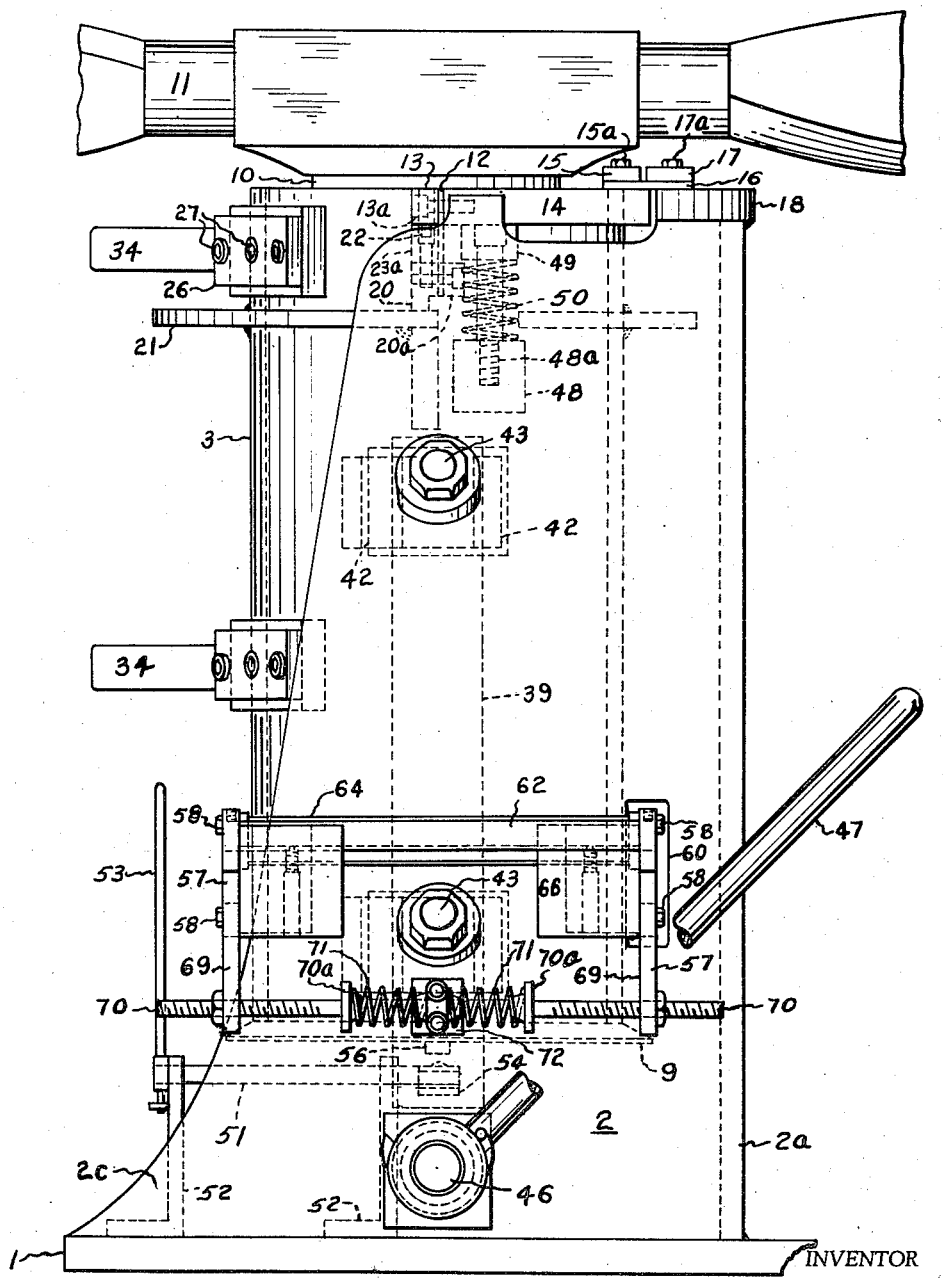
Fig. 3 is a side elevational view.
Figure 4:
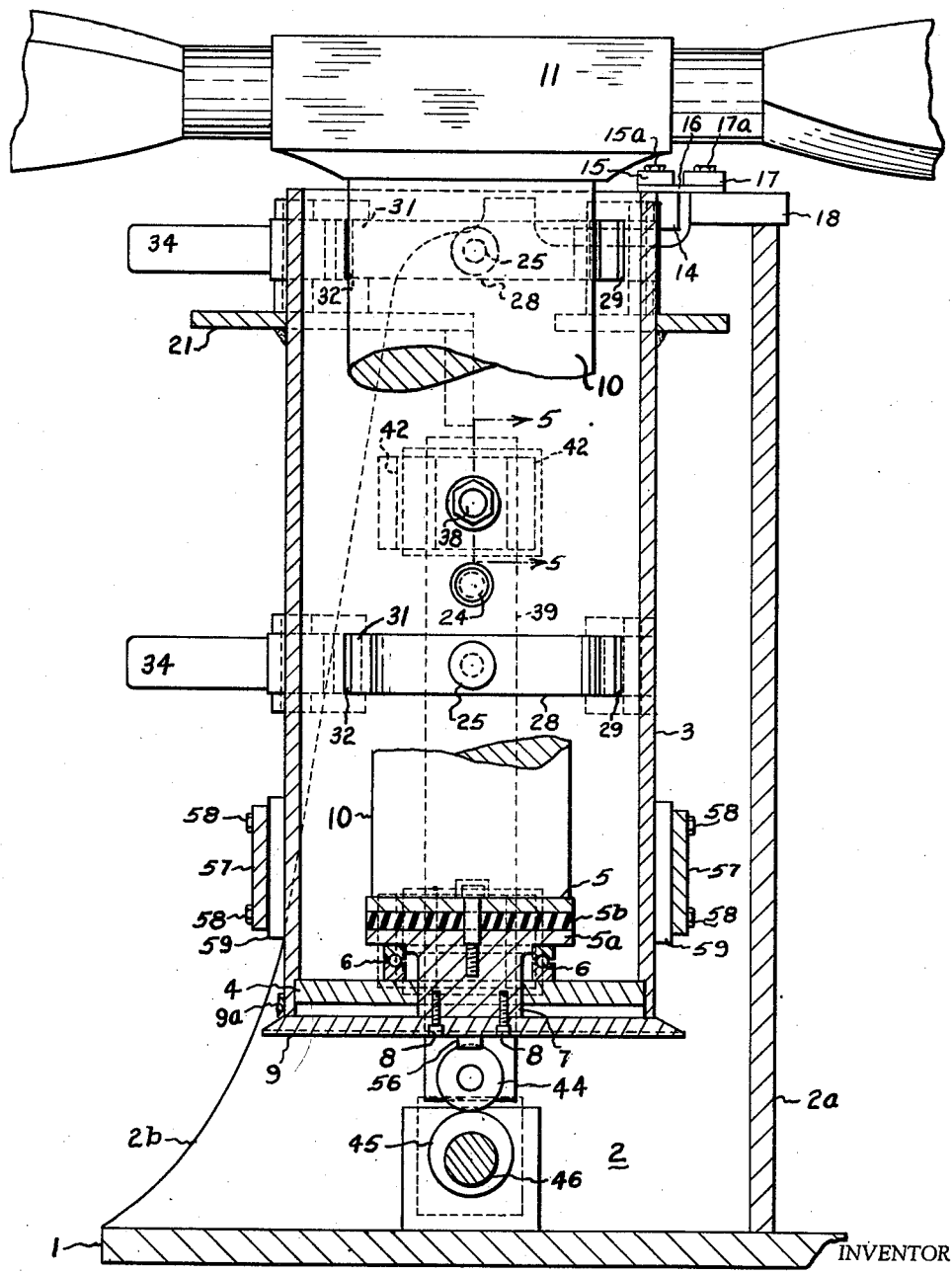
Fig. 4 is a vertical sectional view taken on the line 4—4 of Fig. 2.

For accurately testing balance of the unit comprising the propeller 11 and its shaft 10, it is necessary to dispose the shaft with its axis coincident with that of the carrier, preliminary to a testing operation. To roughly establish such an axial relation, there are clamped to the carrier, about midway of its length, three pins 24 (Figs. 2 and 4) spaced preferably 120 degrees apart, and similarly projecting toward the carrier axis, their inner ends being beveled to downwardly guide the shaft. These pins are clamped to the carrier by nuts 24a.

Figure 1:
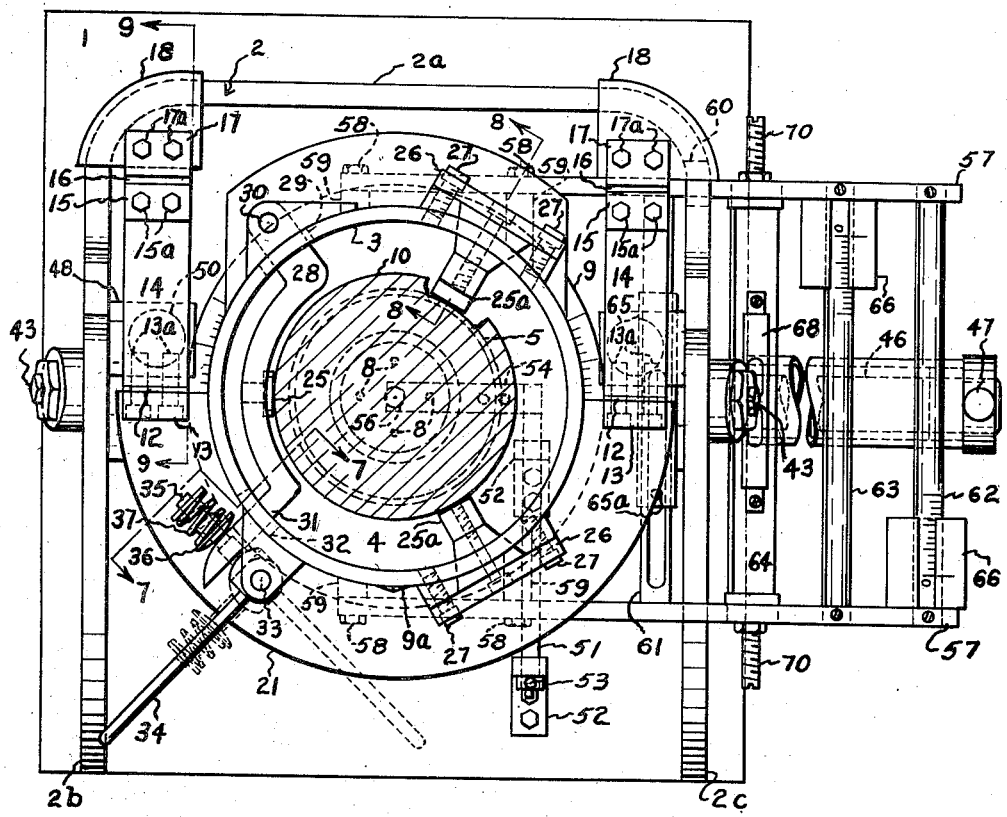
Fig. 1 is a top plan view of the improved machine, sectionally showing the shaft of a workpiece.

To accurately locate the shaft 10 in the carrier, there are employed duplicate sets of clamps suitably vertically spaced upon the carrier (Figs. 1 and 8). Each of such sets comprises a jaw 25 and two duplicate jaws 25a radially mounted on and projecting into the carrier at 120 degree intervals. The jaws 25a are rigidly carried by plates 26 secured exteriorly to the carrier by screws 27. The jaw 25 is fixed on the mid portion of a lever 28, arcuately curved to extend horizontally between the carrier and shaft 10. Said lever has a rear end bent to extend outwardly through an opening 29 in the carrier and pivoted at 30 upon and exterior to the carrier. The front end of each lever is outwardly bent at 31 to extend freely through an opening 32 of the carrier. Coacting with the end 31 is a bell crank lever pivoted at 33 and comprising a handle 34 and a relatively transverse arm 35. The latter slidingly mounts a collar 36 urged by a spring 37 against the lever end 31, such end being forked as appears in Fig. 7 to permit said arm with its collar and spring to be swung clear of the end 31, as shown in dash lines in Fig. 1. The arrangement is such that the lever 28 and its jaw 25 are urged by the spring 37 toward the shaft 10 when the bell crank 34, 35 is in its full line position (Fig. 1) and are relieved of pressure when the bell crank is in its dash line position. When the shaft is operatively engaged by the two sets of clamps, its axis is accurately located at the carrier axis.

*Pivot relief provision*

The carrier 3 rigidly carries an upper and a lower pair of outwardly projecting studs 38, such studs of each pair being diametrically opposed and having their axes normally in the vertical plane established by the suspension plates 12, and serving under certain conditions to transfer load from the carrier to a pair of vertically elongated lifter bars 39, so as to relieve said suspension plates. Thus each lifter bar is formed with two circular openings 40 so vertically spaced as to receive a stud of each pair, such openings being large enough to afford the carrier its maximum intended swinging, when the studs are substantially centered in said holes. Each hole 40 has an approximately semicircular downward extension 41 conforming in radius to the associated stud. Hence a slight upward travel of the lifter bars will seat the studs in the extensions 41 and thus load said bars, or a slight lowering of the carrier will effect such seating and loading. The lifter bars are each slidable in vertically spaced bearings 42 rigidly inwardly projecting from the housing, and each such bearing mounts an adjustable pin 43 extending through the associated housing wall and terminally engageable by the associated stud 38 to limit upward actuation of the carrier. It is preferred to incline the pins 43 slightly downward toward their inner ends and to bevel the outer ends of the studs to conform to the inclined inner end faces of the pins (Fig. 5). Thus said pins form stops engageable by the studs in a raised position of the carrier to definitely establish such position. The lower ends of the lifter bars mount rollers 44 rotatable on a horizontal axis, and such rollers seat on cams 45 fixed on a rockshaft 46. The latter rigidly carries an elongated upstanding actuating lever 47, through which the cams may be rocked to raise or lower the bars 39 a predetermined distance.

*Overload relief feature*

Rigidly secured to and inwardly projecting from each side wall of the housing 2 is a block 48, downwardly spaced from the front portion of the associated arm 14. Threaded into each such block is an upstanding screw 48a headed to retain a collar 49 on the top portion of such screw, such collar being normally held in close proximity to the overlying arm by a preloaded compression spring 50 interposed between said block and collar. Upon any downward swinging of the arms 14 due to an excessive load on the carrier, the springs 50 will yield, permitting such swinging and a resultant slight bodily lowering of the suspension plates 12, together with the carrier. This will suffice to seat the studs 38 in the extensions 41 of the lifter bar openings, thus limiting stress on the suspension plates and preventing use of the machine until its applied load is suitably reduced. As best appears in Fig. 1, the flange 21 has portions thereof cut away beneath the arms 14 to accommodate the overload springs 50.

*Means for damping carrier oscillations*

Extending beneath the carrier, at one side thereof, is a rock-shaft 51 journaled in brackets 52 upstanding from the base 1, such shaft being actuable by an upstanding lever 53. Rigidly projecting from said shaft toward the carrier axis is an arm 54 (Fig. 2) and an elongated spring 55 substantially coextensive with said arm is fixed on the latter at its shaft-engaging end. Said spring diverges upwardly from the arm in extending toward said axis and is engageable at said axis with a button 56 centrally fixed on the index plate 9. By rocking the shaft 51, a selective pressure may be applied through the spring 55 to the bottom 56 to quickly arrest any oscillation of the carrier. The arm 54 safeguards the spring from excessive flexure.

*Mounting of counter-weights, level, and stabilizing springs*

Laterally projecting from the lower portion of the carrier 3 is a frame comprising a pair of parallel bars 57, rigidly secured to the front and rear faces of the carrier by screws 58 engaging spacer blocks 59, the wall 2c being apertured at 60 to afford clearance to the rearmost of said bars. Said bars are interconnected by three tubular weighing beams 61, 62 and 63, and also by an angle bar 64, such connections being suitably horizontally spaced. The beam 61 mounts a slidable weight 65 which may be adjusted to establish accurate balance of the unloaded machine as initially installed, a screw 65a serving to maintain any set position of said weight.

The beams 62 and 63 each carry a sliding weight 66 and are reversely graduated to indicate the linear amount of any adjustment of the weights. The angle bar 64 mounts a bubble type level 68, such that the bubble will assume a central position when the carrier is in perfect balance.

In exterior proximity to the wall 2c, the bars 57 are rigidly formed with downward extensions 69 mounting a pair of aligned adjusting screws 70, which carry mountings 70a for the outer ends of a pair of preloaded accurately equalized, collinear, stabilizing compression springs 71. The inner ends of such springs are mounted on and about a lug 72 rigidly affixed to the wall 2c midway between the extensions 69. The considerable downward spacing of these springs from the pivotal axis of the carrier (established by the plates 12) affords them an effective leverage in overcoming instability of a workpiece. Also they sufficiently resist oscillation of the carrier to avoid, in most balancing operations, any need for actuating the damper mechanism 51—55.

*Operation of machine*

In testing a workpiece which requires no correction, the carrier will maintain its vertical position and hence the stabilizing springs will maintain their described position and equalized preload. If the carrier tilts responsive to an unbalanced workpiece, the spring 71 underlying the heavier half of the work will be increasingly compressed, while the spring underlying the lighter half will be afforded an expansion reducing its preload. Thus both springs predeterminedly resist tilting of the carrier, while maintaining a requisite ratio between unbalanced weight and resultant angular shifting of the carrier. In testing parts having substantially the same form and dimensions, the stabilizing springs may be maintained under the same preloading stress. In adapting the machine to workpieces differing in weight or in the upward distance of their centers of gravity from the horizontal pivot axis, the preloading stress applied to said springs must be suited to such pieces. Such regulation of sensitivity as has been heretofore provided has required raising or lowering of the pivot point or axis of the carrier, so as to vary the vertical distance of such point or axis from the center of gravity of the loaded carrier. Regulation of the springs 71 of the described machine affords a simple control of sensitivity.

In use of the described machine, the lifting bars 39 are raised and the work-clamping mechanisms 25—37 are released preliminary to placement of work in the carrier. Thus the carrier is supported by the lifter bars and no undue stresses will be imposed on the pivot plates 12 due to work placement. Also the clamping jaws 25 and 25a will not impede the workpiece as it is lowered to its seat on the turntable.

When a workpiece has been clamped in place, the operator lowers the lifter bars, thus locating the studs 38 substantially centrally in the oversized openings 40 so that the pivot plates 12 may function. If the workpiece is in perfect balance the carrier will not tilt, and also there will be no tilting if the center of gravity of the piece happens to be initially located in the vertical plane established by said pivot plates. If there occurs any tilting of the carrier and workpiece when the latter is thus initially tested, it is necessary to either apply sufficient known weight to the piece to bring the level bubble to zero, or to rotate the work, after releasing the clamps and raising the lifter bars, until the bubble centers upon a subsequent lowering of the bars. The operator now applies the clamps and raises the lifter bars, and then rotates the work (together with the turntable) through 90 degrees. Thus it is assured that the center of gravity of the work will be located in a plane transverse to the horizontal pivot axis. The weight 66 on one of the beams 62 and 63 is now adjusted to center the bubble in the level 68, the reading established by the adjusted weight being the amount of inch-ounce unbalance of the work plus or minus the unbalance (if any) of the carrier.

The operator now releases the clamps and raises the lifter bar to relieve the pivot plates and then rotates the work together with the turntable 180 degrees. Upon applying the clamps and lowering the lifter bars, the carrier tilts oppositely to its previous titlting, due to the previously adjusted weight 66 plus the unbalance of the work. These factors are equal and exclude unbalance (if any) of the carrier itself. The other of the two sliding weights 66 is now adjusted on its beam until the level indication at 68 is zero. Since the reading established by the last adjusted weight indicates twice the unbalance of the work, it is now a simple matter of dividing said reading by two to obtain the exact amount, in inch-ounces of the unbalance of the workpiece.

By adapting the spring suspension plates 12 to be bodily raised when the carrier is lifted by the bars 39, there is avoided any such buckling of said plates as would necessarily occur if the plates could not fully participate in uptravel of the carrier.

What I claim is:

1. A machine for testing the balance of a workpiece having a drive shaft, such machine comprising a vertically elongated carrier including a member for seating the lower end of said shaft as it extends downwardly from the driven member, means for pivoting the carrier at its upper portion to swing about a horizontal axis, the carrier having an axis of equilibrium transverse to and intersecting said horizontal axis and vertically disposed in the absence of unbalance of the carrier and work piece, means on the carrier for centering and clamping said shaft substantially at said axis of equilibrium, spring means acting on the carrier and resisting its swinging about and to either side of said horizontal axis and thus compensating for instability of the workpiece, and means for indicating the extent of said swinging of the carrier.

2. In a balance-testing machine as set forth in claim 1, said spring means including two preloaded springs acting equally and oppositely on the carrier, said springs being coiled and substantially collinear, an abutment for both springs fixed relative to the carrier, and means for imposing thrust on the carrier from the relatively remote ends of the springs.

3. In a balance-testing machine as set forth in claim 1, means for journaling said shaft-seating member on the carrier for rotation about said axis of equilibrium.

4. A balance-testing machine as set forth in claim 1, said carrier forming an open-topped vertically elongated chamber to receive said shaft and including a centrally apertured bottom plate, and said shaft-seating member being disposed above and rotative upon the bottom plate about the carrier axis of equilibrium, antifriction means interposed between the seating member and bottom plate and facilitating said rotation of the seating member, a driving element secured to the shaft-seating member and rotative within the central aperture of the bottom plate, and means for indexing rotation of the shaft-seating member, such means including an element fixed on and driven by said driving element and disposed beneath the bottom plate.

5. In a balance-testing machine as set forth in claim 3, a plate disposed upon and beneath the carrier and marginally graduated to index rotation of said seating member, and means rigidly securing said indexing plate to said seating member.

6. In a balance-testing machine, a pivot relief mechanism comprising a housing, a work carrier within the housing, means for pivoting the carrier at its upper portion on the housing to swing about a horizontal axis, a pair of lifter bars vertically slidable at opposite sides of the carrier, and formed with horizontally opposed openings centered substantially in the vertical plane containing said horizontal axis, a pair of studs fixed on and oppositely projecting from the carrier and inserted in said openings, said openings being proportioned to clear said studs and thus afford pivoting of the carrier in a lowered position of the bars, and to cause the bars to engage and seat the studs as the bars approach their lifted position, whereby the pivot means is relieved of the carrier load in the raised position of said bars, and means for sliding said bars up and down in unison, and means for indicating the extent of said swinging of the carrier.

7. In a balance-testing machine, a pivot relief mechanism as set forth in claim 6, stops fixed on the housing in outwardly spaced relation to the lifter bars and engageable by said studs to resist lateral movement of the carrier in the vertical plane established by its horizontal pivotal axis.

8. In a balance-testing machine, work positioning means comprising a carrier formed with a vertically elongated, open-topped chamber to receive a shaft included in a workpiece to be tested, a seating member for said shaft mounted on the lower portion of the carrier, a plurality of members spaced circumferentially of and projecting into said chamber from the carrier for roughly positioning said shaft at the axis of said chamber, a plurality of circumferentially spaced clamping jaws projecting from the carrier into said chamber for accurately positioning said shaft at the axis of said chamber, means for actuating one of said jaws to and from said axis for clamping the shaft in conjunction with the other jaws, and means for pivotally mounting the carrier at its upper portion to swing about a horizontal axis, intersected by the axis of said chamber, and means for indicating the extent of such swinging of the carrier.

9. In a balance-testing machine, work suspension means comprising a work carrier, a pair of laterally flexible normally vertical elements disposed at opposite sides of and jonitly forming a pivotal suspension for the carrier, whereby the carrier may swing laterally responsive to work unbalance, means for attaching the carrier to the lower portions of said elements, a pair of substantially parallel and substantially horizontal spaced arms, means for attaching the upper portions of said elements to corresponding ends of the arms, supporting means for the other ends of the arms affording an up and down swinging of the arms, and means for bodily lifting the carrier to relieve said flexible elements of the carrier load, whereby such elements may shift bodily upward responsive to lifting of the carrier, and means for indicating the extent of lateral swinging of the carrier.

10. In a balance testing machine as set forth in claim 9, a pair of spring devices respectively underlying the respective arms and yieldably resisting downward swinging of the arms.

11. A machine for testing the balance of a workpiece having a drive shaft, such machine comprising a substantially cylindrical and substantially vertical elongated hollow carrier, the work piece being disposed above the carrier and the shaft extending downwardly and centrally into the carrier, and the carrier having upon its lower portion a seat for the shaft, spaced upper and lower shaft-clamping mechanisms mounted on the carrier for establishing the shaft at the axis of the carrier, means for pivoting the carrier at its upper portion to swing about a horizontal axis, spring means acting on the carrier and resisting its swinging about and to either side of said horizontal axis and thus compensating for instability of the workpiece, and means for indicating the extent of any such swinging of the carrier.

12. A balance testing machine comprising a vertically elongated work carrier having at its lower position a seat for a workpiece, a housing receiving said carrier, means mounting the carrier at its upper portion on the housing and establishing a horizontal pivotal axis for forward and back swinging of the carrier, a frame rigidly mounted on and laterally projecting from the lower portion of the carrier, a weight adjustable on said frame transversely to the vertical plane established by said horizontal axis, and means carried by said frame exterior to said housing and indicating the angular extent of any swinging of the carrier about said axis.

13. In a balance testing machine, comprising a work carrier, a pair of laterally flexible normally vertical elements disposed at opposite sides of and jointly forming a pivotal suspension for the carrier, means for mounting the carrier upon the lower portions of said elements, a pair of substantially parallel and substantially horizontal spaced arms, means for mounting the upper portions of said elements upon corresponding ends of the arms, supporting means for the other ends of the arms affording an up and down swinging of the arms, means interengaging said corresponding ends of the arms with the carrier to limit swinging of the carrier about said elements and thus limit flexure of said elements, and means for indicating the extent of said swinging of the carrier.

14. A balance testing machine as set forth in claim 13, said interengaging means comprising tongue and groove connections between the arms and carrier, such connections being elongated substantially horizontally and transversely to the arms.

15. A balance testing machine comprising a vertically elongated work carrier including a seat for a work piece, means for pivoting the carrier at its upper portion to swing about a horizontal axis, a pair of studs oppositely projecting from the carrier, a pair of elongated lifter bars vertically slidable at opposite sides of the carrier and oppositely formed with openings receiving and having clearance from the studs in the lowered position of the bars and seating the studs in the raised position of the bars, whereby the carrier weight is applied to the raised bars, means for sliding the bars up or down in unison, and means for indicating the extent of swinging of the carrier about said horizontal axis.

16. In a balance testing machine, a vertically elongated work carrier having at its lower portion a seat for a workpiece and having a substantially vertical axis of equilibrium, a pair of substantially horizontal supporting arms for the carrier adjoining the upper portion of the carrier and oppositely spaced from said axis of equilibrium, means mounting the carrier on corresponding ends of said arms and establishing a horizontal pivotal axis for swinging of the carrier, supporting means for said arms engaging their other ends and including members flexible up and down to afford a predetermined lowering of the arms and carrier when the carrier is overloaded, means for seating the carrier responsive to such lowering thereof and thus relieving the means establishing said horizontal pivotal axis, and means for indicating the extent of swinging of the carrier about said horizontal axis.

References Cited in the file of this patent

UNITED STATES PATENTS

| | | |
|---|---|---|
| 313,468 | Becker | Mar. 10, 1885 |
| 531,487 | Vauclain | Dec. 25, 1894 |
| 921,424 | Makean | May 11, 1909 |
| 1,701,464 | Kraft | Feb. 5, 1929 |
| 1,774,718 | McCabe | Sept. 2, 1930 |
| 1,951,828 | Heymann et al. | Mar. 30, 1934 |
| 2,043,845 | Thearle | June 9, 1936 |
| 2,122,621 | Ohly | July 5, 1938 |
| 2,388,705 | Reiber | Nov. 13, 1945 |
| 2,502,633 | Shepherd | Apr. 4, 1950 |
| 2,524,407 | Trindle | Oct. 3, 1950 |

FOREIGN PATENTS

| | | |
|---|---|---|
| 851,558 | Germany | July 8, 1949 |